Sept. 8, 1964   Q. J. HAWTHORNE   3,147,941
AIRPLANE WING ATTACHMENT AND MOUNTING THEREFOR
Filed Jan. 4, 1962   5 Sheets-Sheet 1

INVENTOR
QUINTIN J. HAWTHORNE
BY Cushman, Darby & Cushman
ATTORNEYS

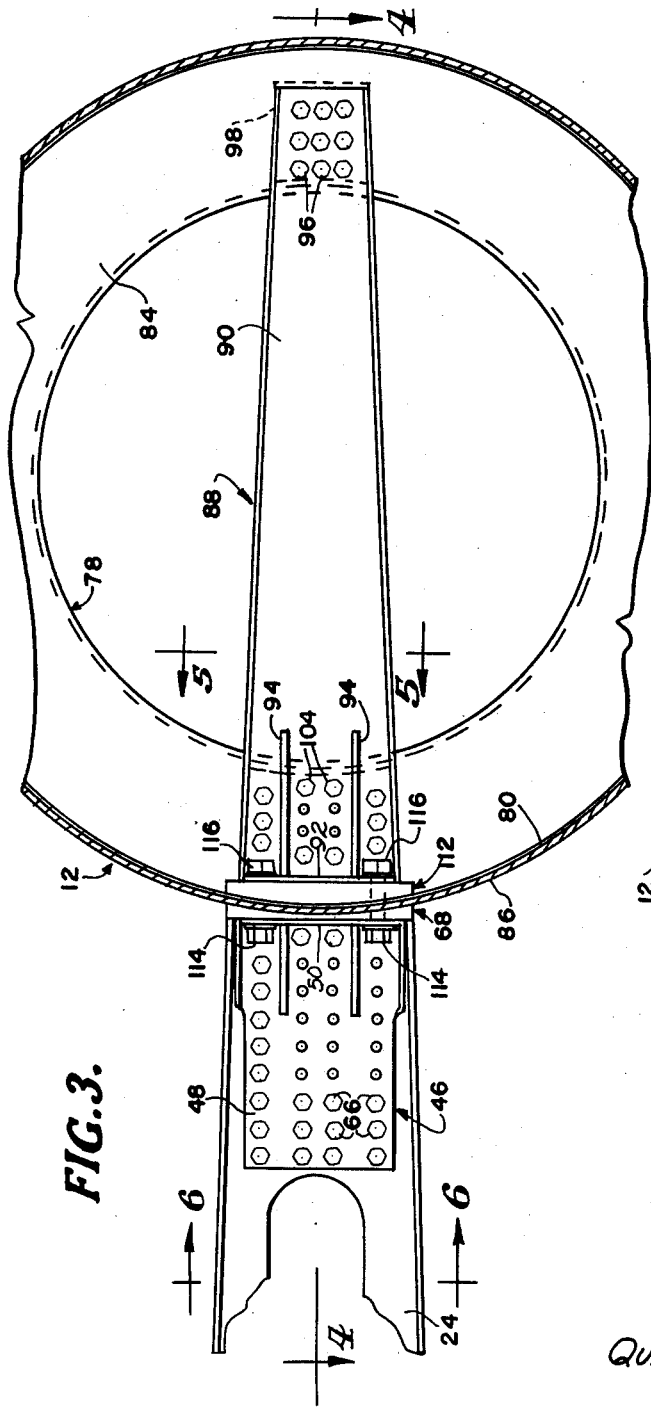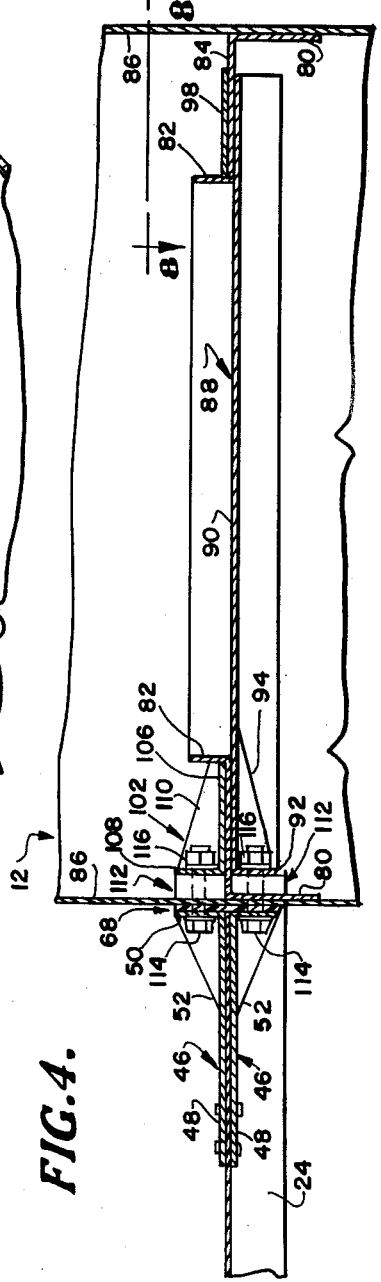

Sept. 8, 1964   Q. J. HAWTHORNE   3,147,941
AIRPLANE WING ATTACHMENT AND MOUNTING THEREFOR
Filed Jan. 4, 1962   5 Sheets-Sheet 3

INVENTOR
QUINTIN J. HAWTHORNE

BY Cushman, Darby & Cushman
ATTORNEYS

Sept. 8, 1964     Q. J. HAWTHORNE     3,147,941
AIRPLANE WING ATTACHMENT AND MOUNTING THEREFOR
Filed Jan. 4, 1962     5 Sheets-Sheet 4

INVENTOR
QUINTIN J. HAWTHORNE

BY Cushman, Darby Cushman
ATTORNEYS

Sept. 8, 1964  Q. J. HAWTHORNE  3,147,941
AIRPLANE WING ATTACHMENT AND MOUNTING THEREFOR
Filed Jan. 4, 1962  5 Sheets-Sheet 5
FIG.10.
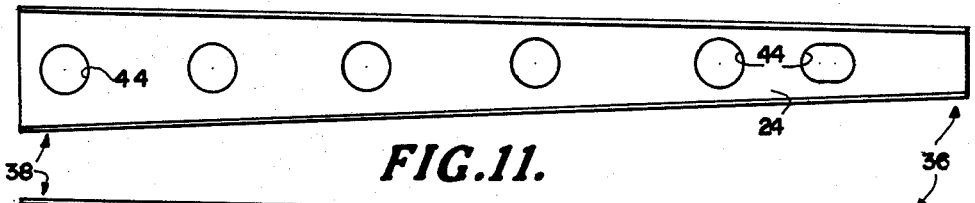
FIG.11.
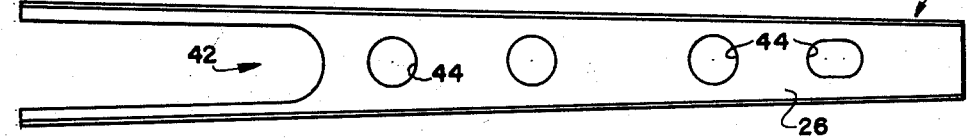
FIG.12.
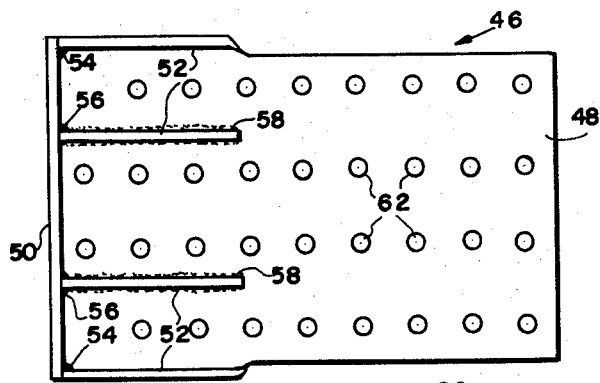
FIG.13.
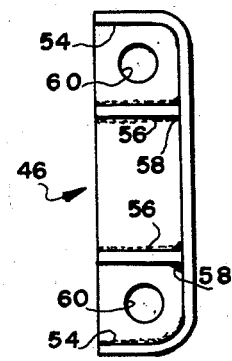
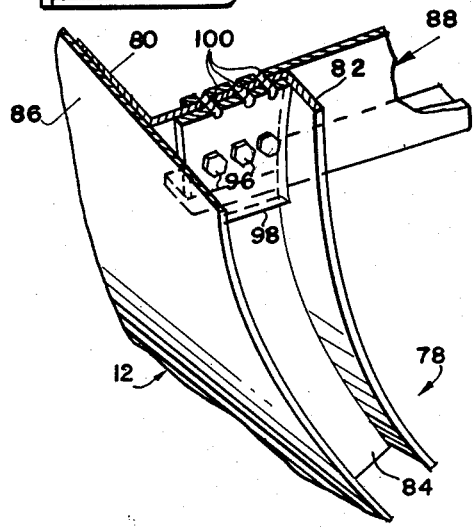
FIG.8.
INVENTOR
QUINTIN J. HAWTHORNE
BY Cushman, Darby & Cushman
ATTORNEYS

United States Patent Office 3,147,941
Patented Sept. 8, 1964

3,147,941
AIRPLANE WING ATTACHMENT AND
MOUNTING THEREFOR
Quintin Jay Hawthorne, Angola, Ind., assignor to Trans-Florida Aviation Inc., Sarasota-Manatee Airport, Fla., a corporation of Florida
Filed Jan. 4, 1962, Ser. No. 164,232
7 Claims. (Cl. 244—135)

This invention relates to the installation of airplane wing tip structures and particularly to the attachment of a tank to the tip of an existing airplane wing which was not originally constructed to carry a tank.

Commercial and private aircraft are conventionally constructed with interior, permanent fuel tanks. Generally, no provision is made for including additional fuel tanks because the original equipment, the normal use of the aircraft and the ready availability of fuel make such provisions unnecessary. However, occasionally it is desirable to add to the flight range of an existing airplane by attaching auxiliary fuel tanks thereto. The incorporation of the additional tanks presents the problem of designing the structural supports to give the necessary strength to the installation, fitting the supports and the tanks to the aircraft without creating undesirable performance characteristics during flight and of providing piping and controls necessary for proper utilization of the fuel in the tanks. Additionally, it is important that the installation be economical and mechanically simple in order to result in a practical solution to the problem of increasing the flight range of a given plane.

The present invention is particularly directed to installing auxiliary fuel tanks on an F–51–D Mustang, a former military airplane built by North American Aviation now in a rather wide use as a civilian plane. It has been found that a light weight fuel tank, such as a conventional teardrop-shaped tank constructed of aluminum, can be effectively and economically mounted on each wing tip of this plane by providing suitable internal supports and fittings in the wing and in the tank. Broadly, the installation is accomplished by adding two reinforcing channel beams longitudinally in each wing, attaching brackets and fittings to the outer ends of the wing channel beams, attaching channel beams and mating brackets and fittings interiorly of the tanks and bolting the two sets of brackets and fittings together in fluid-tight relationship. It has been found advantageous also to modify the tanks internally to include a fuel pump and suitable pipes and valves which will allow the fuel supply to be delivered to the engine or exhausted through the aft end of the tank in an emergency or prior to landing. Additionally, navigation lights and landing lights may be added to the forward section of the tank. The installation has been found to provide the necessary strength and functional reliability required for Federal Aviation Agency certification and can be effected at a cost which is reasonable in view of the advantages derived. While the construction is directed particularly to the modification of a specified airplane, the principles embodied are applicable to the modification of other airplanes as well.

It is therefore an object of the present invention to provide an improved method for attaching a tank to the tip of an existing airplane wing.

It is a further object to provide an improved economical mounting structure for a wing-tip tank which has suitable strength.

It is a further object to provide a novel combination of a wing-tip tank and an existing airplane wing which has suitable strength and functional reliability.

It is a still further object to provide a conventional aircraft fuel tank with reinforcing means, lighting means and fuel pump means whereby said tank is adapted for use as a wing-tip tank on an existing airplane wing.

These and further objects will become apparent upon reading the following detailed description taken in conjunction with the drawings in which:

FIGURE 3 is a fragmentary view on an enlarged scale of part of FIGURE 2;

FIGURE 4 is a plan sectional view taken on the line 4—4 of FIGURE 3;

FIGURE 8 is a perspective view taken substantially on line 8—8 of FIGURE 4;

FIGURE 10 is an elevational view of the forward wing channel beam;

FIGURE 11 is an elevational view of the aft wing channel beam;

FIGURE 12 is a front view of one of the members of FIGURE 9; and

FIGURE 13 is an end view of the member of FIGURE 12, viewed from the right.

Figure 1:
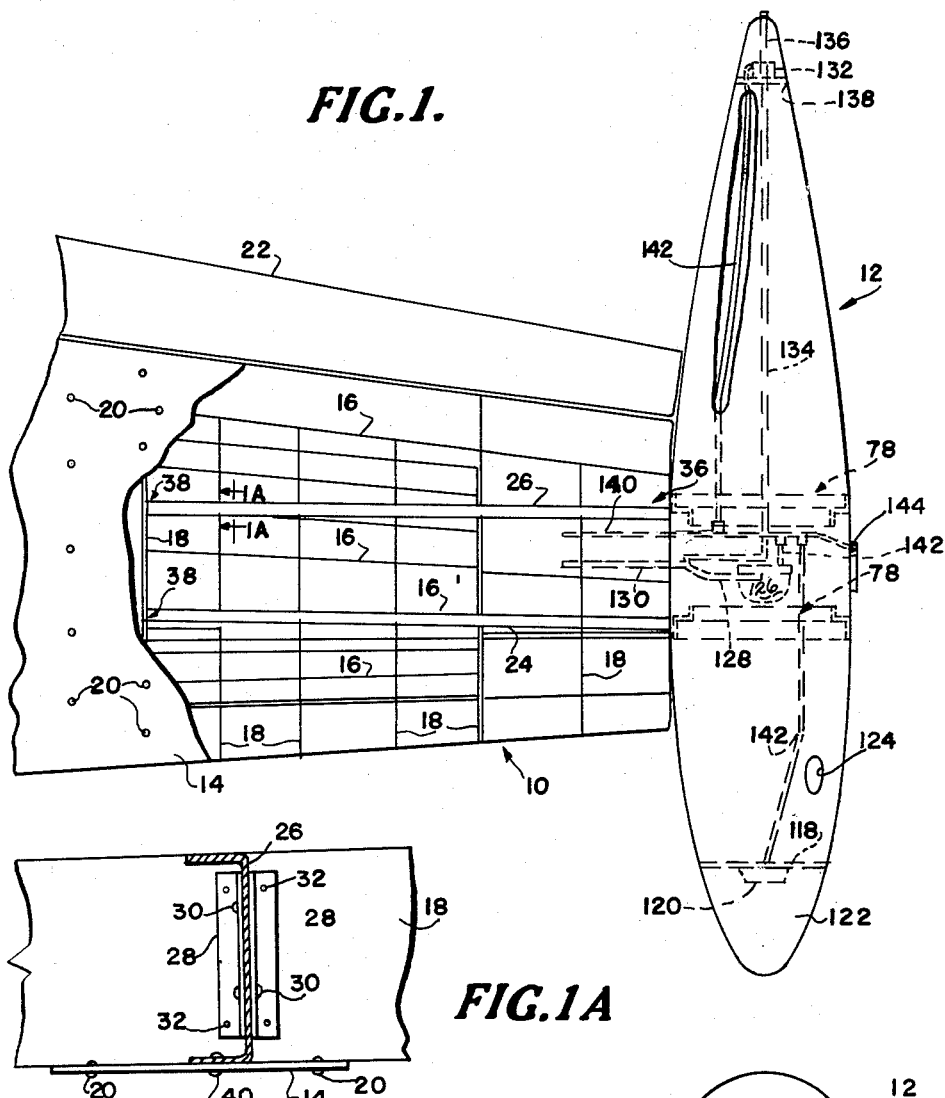
FIGURE 1 is a schematic top plan view of an airplane wing and wing-tip tank connected according to the principles of the present invention.
Figure 2:
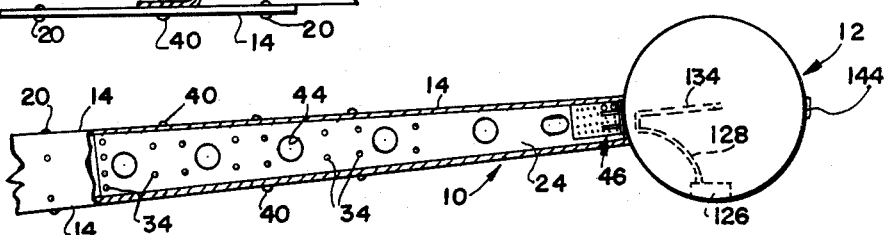
FIGURE 2 is a schematic front elevational view partly in section of the wing-tip and tank of FIGURE 1.

Referring now to the drawings, particularly FIGURES 1 and 2, there is shown a conventional outer end portion 10 of the left wing of an airplane having a tear-drop-shaped tank 12 rigidly attached to the outboard end thereof. The wing, as is conventional, includes an outer flexible metal skin 14 and a plurality of inner support spars 16 and ribs 18 which are suitably interconnected to provide the necessary strength to the wing. The outer skin 14 may conveniently be riveted as at 20 to the spars 16 and ribs 18. The trailing edge of the wing is provided with a conventional aileron 22.

In order to reinforce the conventional wing tip just described and to provide rigid support for the tip tank 12, the construction of the present invention provides two elongated channel beams 24 and 26 which are positioned longitudinally within the outer end of the wing 10 in spaced parallel relation to each other. Preferably, the forward beam 24 is secured parallel to and flush with a main wing spar 16' and the aft beam 26 is positioned parallel to the forward beam 24 and rearwardly thereof. In order to insert the wing beams 24 and 26 into an existing wing, the skin 14 is removed from the outer end portion 10 thereof and portions of the existing ribs 18 are cut away, as necessary, so that the beams 24 and 26 can be inserted. The wing beams may then be secured to the ribs by means of angle clips 28 which may be riveted to the beams as at 30 and to the ribs 18 as at 32. The forward wing beam 24 may additionally be riveted to the main spar 16' as at 34. Preferably, the beams will be formed of such a length that when their outboard ends 36 are flush with the outer end of the wing, their inboard ends 38 are flush with an uncut rib 18. After the wing beams and the other members to be described hereinafter have been installed, the skin 14 is replaced and resecured by the rivets 20 to the ribs and, if desired, by additional rivets 40 to the wing beams.

Figure 1A:
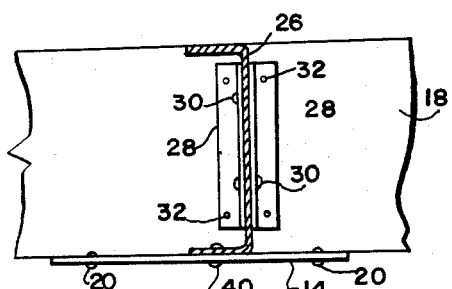
FIGURE 1A is a fragmentary sectional view on an enlarged scale taken on line 1A—1A of FIGURE 1.

In the embodiment shown, the wing channel beams 24 and 26 are positioned in the wing so that the flange portions of each beam face forwardly as seen in FIGURES 1A and 2. The body portion of each beam is tapered to the same extent as is the wing so that the flange portions engage the skin 14 when it is replaced after insertion of the beams. The beams may be identical or, as seen in FIGURES 10 and 11, may be slightly different so as to accommodate the different structures in the existing wing. As shown, the body of the aft wing beam 26 is partially cut away at 42 adjacent its inboard end. In order to reduce the weight of the beams, lightening holes 44 may be provided in their body portions. Preferably, the beams are constructed of Alclad aluminum.

Figure 9:
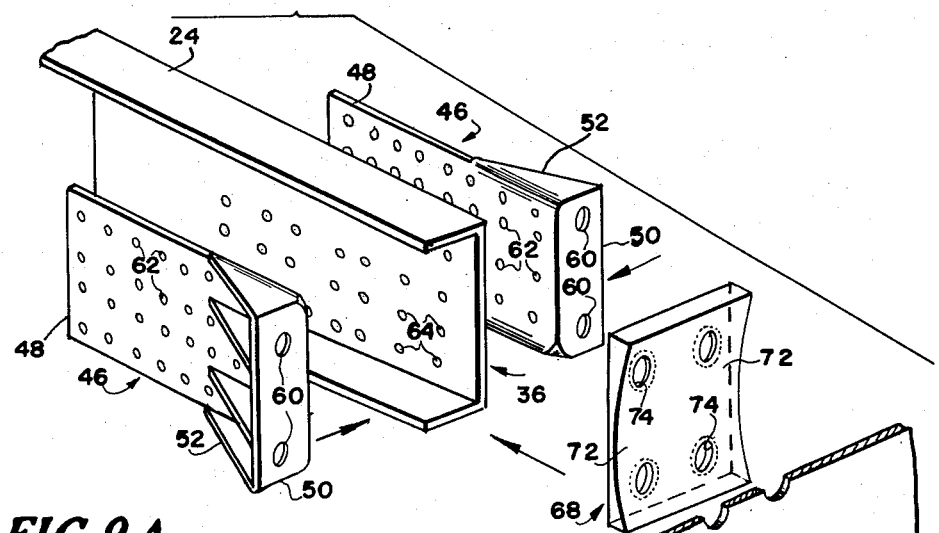
FIGURE 9 is an exploded perspective view of some of the wing reinforcing members.
Figure 9A:
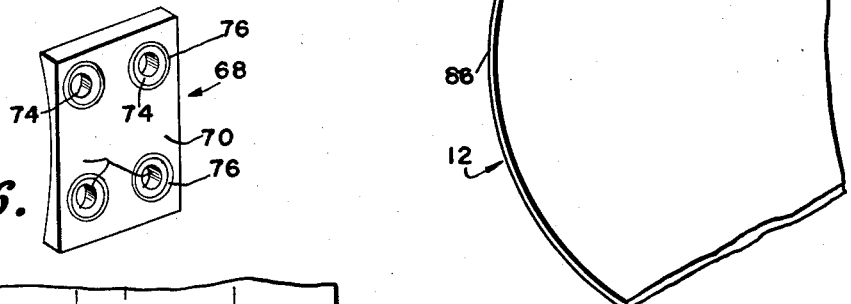
FIGURE 9A is a perspective view showing the opposite side of one of the members in FIGURE 9.
Figure 6:
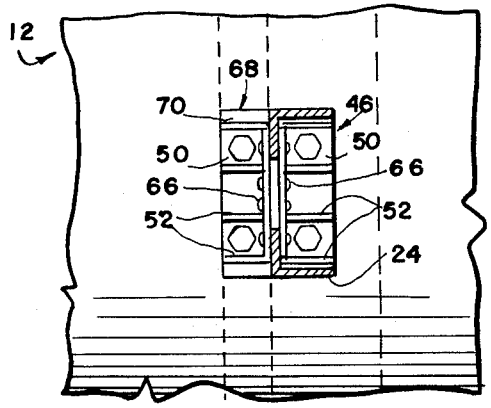
FIGURE 6 is an elevational sectional view taken on the line 6—6 of FIGURE 3.

As best seen in FIGURES 3, 9, 12 and 13, a pair of wing brackets 46 is provided for attachment to the front and back of the outboard ends 36 of each wing channel beam 24, 26. Each wing bracket 46 may be a generally L-shaped structure having a flat body portion 48, a flat foot portion 50 extending at a right angle from one end of the body portion and four triangular bracing members 52 secured in spaced relationship in the angle between the body and foot. As shown, each bracket 46 has been formed from a single plate of appropriate shape, the foot 50 and two outside bracing members having been bent into their final positions and welded along their abutting edges as at 54. The two inner triangular bracing members were then welded to the foot 50 and body 48 portions as at 56 and 58 respectively. Two spaced, relatively large bolt holes 60 are provided in the foot portion 50 and four parallel rows of eight relatively small bolt holes 62 are provided in the body portion 48. The body of the outboard end 36 of each wing channel beam 24, 26 is provided with holes 64 having the same pattern as holes 62 in the brackets 46 so that the brackets 46 may be secured to the beams with bolts 66. As seen in FIGURES 6 and 9, the brackets are adapted to be attached to the front and rear of each beam with the foot 50 of the forward bracket extending forwardly and the foot 50 of the rear bracket extending aft.

The foot portions 50 of each pair of brackets 48 form, with the outboard end edge of the respective beam, a planar surface coextensive with the outboard end of the wing. In order to mate this surface with the convex exterior of the tank 12, a spacer block 68 is provided for insertion between the foot portions 50 and the wall of the tank 12. The spacer block 68 consists of a small block constructed of, for example, aluminum and having a flat surface 70 for engagement with one of the foot portions 50, and a concave surface 72 opposite thereto for engagement with the exterior of the tank 12. Two pairs of spaced bolt holes 74 extend through the block for alignment with the pairs of holes 60 in the respective foot portions 50 and are counterbored, as at 76, adjacent the flat surface 70 to receive a conventional sealing ring (not shown).

Figure 5:
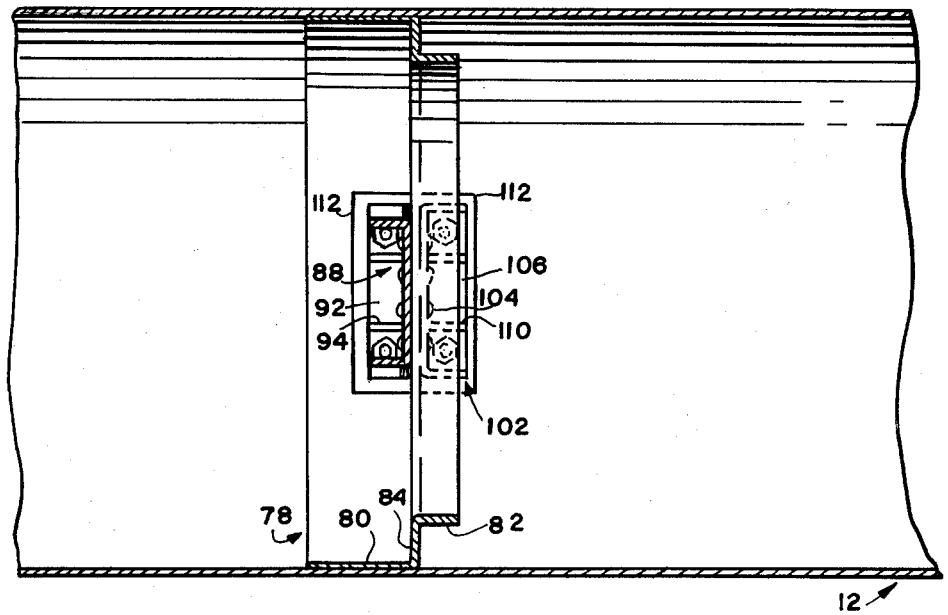
FIGURE 5 is an elevational sectional view taken on the line 5—5 of FIGURE 3.

In order to provide for the attachment and support of the tank 12 on the wing beams 24, 26, the tank 12 is provided internally with beams, brackets and spacer blocks which are similar to those described above. As best seen in FIGURES 1 and 5, the tank 12 conventionally has at least two spaced internal bulkhead Z rings 78 consisting of inner and outer cylindrical portions 80 and 82, respectively, and an intermediate portion 84 integral therewith. The outer cylindrical portion engages the inner surface of the wall 86 of the tank and is secured thereto in any suitable manner thus lending support to the tank. As seen in FIGURE 1, the outer cylindrical portions of the fore and aft bulkhead rings extend forwardly and rearwardly, respectively.

A pair of longitudinally spaced channel beams 88 extend transversely of the tank and are connected to the bulkhead rings near their ends. As seen in FIGURES 3 and 4 each tank channel beam includes an outwardly tapered channel portion 90 and a foot portion 92 at the inboard end thereof which fills the space between the flanges and body of the channel portion 90. Two spaced triangular bracing members 94 are secured in the angle between the foot portion 92 and the body of the channel portion. A plurality of holes through the body of the channel portion 90 near each end thereof provide for the attachment of the tank beams to the intermediate portions 84 of the bulkhead rings with rivets or bolts. The forward tank beam is installed with its flanges facing forward and the aft tank beam is installed with its flanges facing aft.

FIGURE 8 illustrates more in detail the manner in which the outboard ends of each of the tank beams 88 may be attached to the bulkhead rings 78. As shown, the intermediate portion 84 of the bulkhead ring is clamped between the outboard end of the tank beam and a reinforcing plate 98 by means of bolts 96 which pass through holes 100 in the plate, through the intermediate portion 84 of the bulkhead ring and through the body of the tank beam. The inboard end of the backing plate abuts with the inner cylindrical portion 82 of the bulkhead ring.

Figure 7:
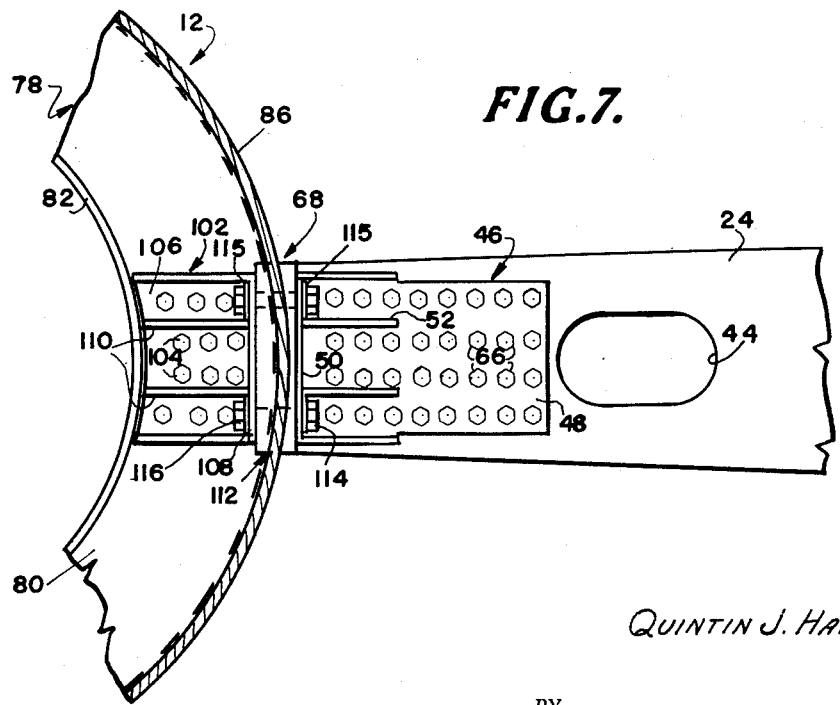
FIGURE 7 is a fragmentary elevational sectional view of part of FIGURE 3 viewed from the rear.

As seen in FIGURES 4, 5, and 7, the intermediate portion 84 of each bulkhead ring is clamped between a tank bracket 102 and the inboard end of one of the tank beams 88 by means of bolts 104. The brackets 102 are generally L-shaped members defined by a body portion 106, a foot portion 108 and four spaced generally triangular bracing members 110 in the angle therebetween. The foot portion is provided with a pair of holes spaced so as to be alignable with the holes 60 in the foot portion of the respective wing bracket member 56. As seen in FIGURE 7, the outboard end of the body of the bracket is concave so as to abut with the inner cylindrical portion 82 of the bulkhead ring, and the inboard end of the foot portion 108 abuts with a spacer block 112.

Each of the four spacer blocks 112 as seen in FIGURES 3–7 are blocks of, for example, aluminum having a convex surface adapted to engage the inner surface of the tank wall 86, a planar surface for engaging either the inboard portion 108 of a tank bracket or the inboard foot portion 92 of the tank beam and a pair of holes for alignment with the holes in the wing spacer blocks 68. The outboard ends of the holes are grooved for the retention of conventional sealing seals (not shown).

After the beams and brackets have been secured to the wing and to the tank as described above, the joining of the tank to the wing tip is readily accomplished by placing the spacer blocks 68 and 112 and the tank 12 in the proper position relative to each other and inserting four mounting bolts 14 through the aligned holes in the feet of the brackets 46 and 102, in the spacer blocks 68 and 112 and in the inboard foot portions of the tank channel beams. As seen in FIGURE 3, the bolts 114 are inserted first through the wing brackets 46 and are provided with nuts 116 adjacent the end portion 92 of the tank bracket or the foot portion 108 of the tank bracket. As the nuts 116 are tightened, the tank wall 86 becomes firmly clamped between the opposed spacer blocks 68 and 112 and rigidly supported by the wing and tank channel beams 24, 26 and 88. The bolt heads and the nuts are provided with suitable washers 115 to prevent leakage along the shank of the bolts and the sealing rings (not shown) in the spacer blocks prevent leakage between the spacer blocks and their respective mounting elements 50, 92 and 108. If desired, a rubber welt (not shown) may be attached, as with screws, along the outboard edge of the wing before the tank is bolted into place.

The tank 12, before modification in accordance with the present invention, normally defines a single fuel-retaining chamber and is generally free of interior equipment. The modifications contemplated in the present construction, in addition to the tank beams 88, tank brackets 102 and spacer blocks 112, include adding to the tank landing and navigation lights and a fuel pumping system for pumping fuel to the airplane engine or for dumping the fuel through a dump valve located in the aft end of the tank. These latter modifications are illustrated in phantom in FIGURES 1 and 2 to indicate their general position, it being understood that the particular lights, fuel pump, lines and fittings and the manner in which they are secured to the tank are subject to variation.

As shown in FIGURE 1, the tank 12 has been modified by the provision of a transverse fluid-tight bulkhead 118 located near the forward end of the tank. The small chamber forward of the bulkhead 118 can then be fitted with a landing light 120, the wall of the tank in that area being replaced with a transparent plastic dome 122 which is secured to the bulkhead in any suitable manner. The interior of the tank aft of the bulkhead 118 forms a fuel-retaining chamber which may be filled through an aperture normally sealed by a conventional filling cap 124.

In order to deliver fuel from the tank to the engine of the airplane, a suitable electric fuel pump 126 is secured to the inner wall of the tank near the bottom thereof and is provided with a fuel inlet aperture (not shown) communicating with the interior of the tank and with a fuel delivery line 128. The line 128 connects with an engine feed line 130 in the wing by means of any suitable fluid-tight connection located at the tank wall adjacent the wing tip.

An emergency fuel dump system is preferably provided in the tank and may take the form of an electrically controlled dump valve 132 communicating with the fuel delivery line 128 and with the atmosphere outside the tank. As shown, the dump valve 132 is located in the aft end of the tank and communicates with the fuel delivery line 128 by means of a line 134 and with the atmosphere through a dump line 136 which extends through the tank wall 86. The dump valve is preferably mounted on a fluid-tight bulkhead 138 which can be installed by cutting off the aft end of the tank, securing the bulkhead 138 to the tank wall and resecuring the aft end of the tank.

An electric conduit 140 in the wing connects through the tank wall by any suitable fluid-tight connection to an electric conduit 142 inside the fuel-retaining chamber between bulkheads 118 and 138 for supplying current for the operation of landing light 120, a navigation light 144 mounted on the exterior of the tank, the fuel pump 126 and the dump valve 132. During normal operation of the airplane engine, fuel is pumped by the pump 126 through lines 128 and 130 to the engine. When it is desired to exhaust fuel from the tank as before a landing or in an emergency, the dump valve 132 is opened and the pump 126 is actuated by the pilot through suitable controls (not shown) to direct the flow of fuel from the pump through line 128, dump valve 132 and dump line 136 to the atmosphere.

It will be understood that both wings of the airplane will be modified to receive a tip tank 12, the construction of the right wing being a mirror image of that described above.

While a preferred embodiment has been described and illustrated, the invention is not intended to be limited to the specific details thereof except as they appear in the appended claims.

What is claimed is:

1. In combination with an airplane wing: a plurality of spaced, generally parallel elongated strengthening members longitudinally in said wing and rigidly attached thereto, said wing strengthening members terminating in a first mounting surface at the outboard end of the wing; a tank; a plurality of spaced, generally parallel elongated strengthening members in said tank and rigidly attached thereto, said tank strengthening members terminating in a second mounting surface spaced from the inner surface of said tank, said tank strengthening members being substantially parallel to said wing strengthening member and extending substantially completely across said tank; first spacer members between said first mounting surfaces and the exterior surface of the wall of said tank, said first spacer members having opposite surfaces which are complementary to said first mounting surfaces and said exterior tank wall surface; second spacer members between said second mounting surfaces and the interior surface of the wall of said tank, said second spacer members having opposite sides which are complementary to said second mounting surfaces and said interior tank wall surface; and fastening means extending through said mounting surfaces, said spacer members and said tank wall.

2. The combination of claim 1 in which said wing strengthening members and said tank strengthening members include elongated tapered channel members having their flange portions extending generally parallel to said wing.

3. The combination of claim 1 in which said tank is circular in transverse cross-section and has spaced internal bulkhead rings and wherein each of said tank strengthening members is secured near each end to opposite locations on a bulkhead ring.

4. The combination of claim 1 wherein at least one of said mounting surfaces is formed by a generally L-shaped bracket having one leg thereof extending parallel to and secured to its respective strengthening member and having its other leg transverse to its respective strengthening member and wherein each of the respective spacer members engages said other leg of its respective bracket.

5. The combination of claim 4 wherein said L-shaped bracket has bracing members connecting the legs of said brackets.

6. In combination with an airplane wing: a plurality of spaced, generally parallel elongated strengthening channel members longitudinally in said wing, each of said channel members having a web portion secured to an existing spar in said wing and having upper and lower flange portions which are parallel to and in engagement with the inner surface of the outer skin of said wing; first L-shaped bracket means secured by one leg thereof to the web of each of said wing strengthening members at the outer end of the member, the other leg extending transversely to the web; a tank having a plurality of spaced interior bulkhead rings; a strengthening channel member associated with each ring and extending diametrically across the interior of said tank and secured at each of its ends to its respective bulkhead ring; second L-shaped bracket means secured by one leg thereof to one end of each of said tank strengthening members, the other leg extending parallel to said other leg of said first bracket means; first spacer means complementary to and engaging the exterior of said tank and said other leg of said first bracket means; second spacer means complementary to and engaging the interior of said tank and said other leg of said second bracket means; and fastening means extending through said other legs of both of said bracket means and through both of said spacer means.

7. In a tank having a circular transverse cross-section and an internal bulkhead strengthening ring, the improved construction which adapts said tank for use as an auxiliary fuel tank for mounting on an airplane wing tip comprising; an elongated support member extending substantially diametrically across said bulkhead ring and secured thereto near each end; spacer means between one end of said elongated member and the adjacent interior surface of the tank wall, said spacer means being contoured to and abutting said one end and said adjacent wall surface; and wherein said bulkhead ring includes a ring portion transverse to said tank and having flat surfaces facing opposite ends of said tank, an outer cylindrical portion integral with said ring portion and in contact with the inner surface of said tank and an inner cylindrical portion integral with said ring portion and concentric with said outer cylindrical portion and wherein the ends of said elongated support member overlie and are secured to a flat surface of said ring portion at diametrically opposed locations.

References Cited in the file of this patent

UNITED STATES PATENTS

| | | |
|---|---|---|
| 1,724,482 | Hicks | Aug. 13, 1929 |
| 2,187,729 | Contini | Jan. 23, 1940 |
| 2,689,698 | Agnew | Sept. 21, 1954 |
| 2,955,787 | Ray | Oct. 11, 1960 |

FOREIGN PATENTS

| | | |
|---|---|---|
| 1,013,175 | Germany | Aug. 1, 1957 |